US010746545B2

(12) United States Patent
Fleming

(10) Patent No.: US 10,746,545 B2
(45) Date of Patent: Aug. 18, 2020

(54) SYSTEM AND METHOD FOR INDOORS ALTITUDE DETERMINATION

(71) Applicant: Intel Corporation, Santa Clara, CA (US)

(72) Inventor: Peter Fleming, Newbury (GB)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 15/609,981

(22) Filed: May 31, 2017

(65) Prior Publication Data

US 2018/0003494 A1 Jan. 4, 2018

(30) Foreign Application Priority Data

Jul. 1, 2016 (EP) ..................... 16177662

(51) Int. Cl.
*G01C 5/06* (2006.01)
*H04W 4/35* (2018.01)
(Continued)

(52) U.S. Cl.
CPC ............ *G01C 5/06* (2013.01); *G01C 21/206* (2013.01); *G01L 13/06* (2013.01); *G01S 19/45* (2013.01);
(Continued)

(58) Field of Classification Search
CPC ......... G01C 5/06; G01C 21/206; G01L 13/00; G01L 13/06; H04W 4/025; H04W 4/04; H04W 4/33; H04W 4/38
(Continued)

(56) References Cited

U.S. PATENT DOCUMENTS

2009/0286556 A1* 11/2009 Yumoto ................. G01C 21/20
 455/456.6
2012/0013475 A1 1/2012 Farley et al.
(Continued)

OTHER PUBLICATIONS

"A Quick Derivation relating altitude to air pressure" Version 1.03, of Dec. 22, 2004 published by the Portland State Aerospace Society and available via the website http://www.psas.pdx.edu.
(Continued)

*Primary Examiner* — Benjamin R Schmitt
(74) *Attorney, Agent, or Firm* — Schwegman Lundberg & Woessner, P.A.

(57) ABSTRACT

Altitude determining circuitry for use in a User Equipment (UE) of a wireless communication network is provided. The circuitry comprises a receiver to receive at least one pressure parameter representative of a plurality of indoors pressure measurements from a respective plurality of indoors pressure measurement units located inside a building at different altitudes. The altitude determining circuitry also has processing circuitry to receive from a pressure sensor in the User Equipment a local pressure measurement at the UE and the processor determines an indoors altitude of the UE using the at least one pressure parameter and the UE local pressure. An integrated circuit for a Global Navigate Satellite System comprising the altitude determining circuitry and an indoors pressure measurement unit having a sensor for making a pressure measurement and a transmitter for transmitting the pressure measurement to the UE or to a further indoors pressure measurement unit are also provided.

16 Claims, 9 Drawing Sheets

(51) Int. Cl.
  *H04W 4/33* (2018.01)
  *H04W 4/02* (2018.01)
  *G01C 21/20* (2006.01)
  *G01L 13/06* (2006.01)
  *G01S 19/45* (2010.01)

(52) U.S. Cl.
  CPC ............ *H04W 4/025* (2013.01); *H04W 4/33* (2018.02); *H04W 4/35* (2018.02)

(58) Field of Classification Search
  USPC .......................................................... 73/384
  See application file for complete search history.

(56) References Cited

U.S. PATENT DOCUMENTS

| | | |
|---|---|---|
| 2012/0265373 A1 | 10/2012 | Ingvalson et al. |
| 2014/0114567 A1 | 4/2014 | Buchanan et al. |
| 2014/0135040 A1 | 5/2014 | Edge et al. |
| 2015/0133145 A1 | 5/2015 | Palanki et al. |
| 2015/0292885 A1* | 10/2015 | Sasaki ................. G01C 25/00 73/384 |
| 2015/0330779 A1* | 11/2015 | Moeglein ............. G01C 5/06 342/462 |

OTHER PUBLICATIONS

Extended European Search Report dated Jan. 17, 2017, on application No. 16177662.0.

* cited by examiner

SYSTEM AND METHOD FOR INDOORS ALTITUDE DETERMINATION

RELATED APPLICATIONS

This application claims the benefit of European Patent Application No. EP 16177662.0, filed on Jul. 1, 2016, the entire contents of which is hereby incorporated by reference in its entirety.

TECHNICAL FIELD

Embodiments relate to determining an indoors altitude of a user equipment in a wireless communications network.

BACKGROUND

Determining an outdoors location (geographical position) of a User Equipment (UE) in a wireless communications system can be performed using signal measurements made by the UE or an associated eNode B and also by using position and/or velocity calculations based on the signal measurements. One example of a wireless communications network is a network implementing third generation partnership project (3GPP) Long Term Evolution (LTE) or LTE-Advanced (LTE-A) technology. Positioning methods that are used in wireless networks include network assisted Global Navigation Satellites Systems (GNSS) methods, downlink positioning and enhanced cell-identification methods. GNSS methods can be ineffective when a UE is located indoors due to attenuation of the signals by roofs, walls and other objects. Even where an indoors location can be performed using GNSS, the level of accuracy is likely to be too low for the derived indoors position to be useful for potential applications such as indoors navigation in buildings such as museums, airports and hospitals and mobile object-tracking for objects such as mobile robots or specialist equipment (e.g. hospital equipment).

BRIEF DESCRIPTION OF THE DRAWINGS

Embodiments described herein are illustrated, without limitation, by way of example, in the accompanying drawings in which.

DESCRIPTION OF EMBODIMENTS

Figure 1:
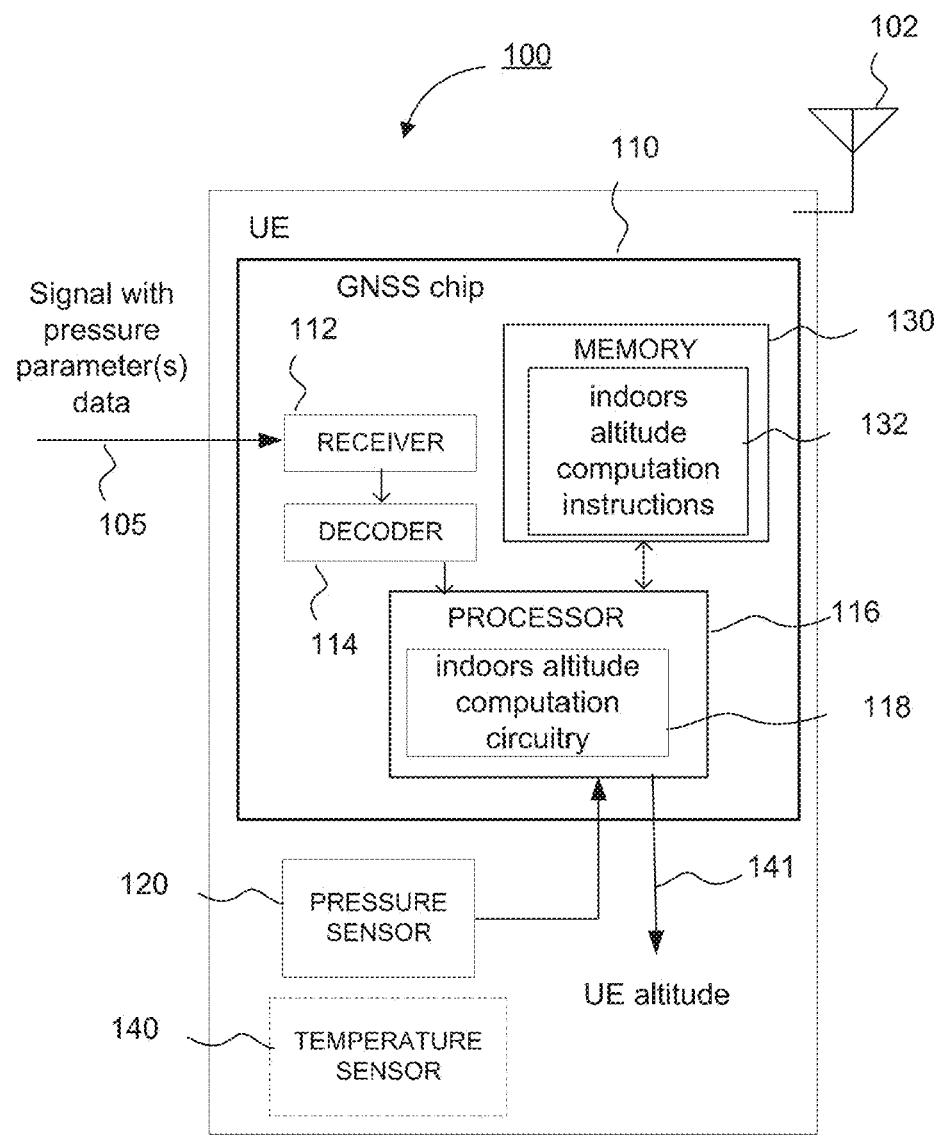
FIG. 1 schematically illustrate illustrates a User Equipment (UE) incorporating a Global Navigation Satellite System (GNSS) chip according to one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

One aspect of determining an indoors position of a UE may be an altitude determination, allowing a floor level of the UE to be identified in a building. One way of performing an indoors altitude estimate for a UE is to use a standard model of the atmosphere (i.e. a standard vertical pressure gradient model) and to convert a measured difference in pressure between a UE position and a pressure measurement made at a point of known altitude, such an outdoors ground-level pressure measurement, to an estimated difference in altitude.

The network, or a user application, may request calculation of an estimated indoors location such as a floor level of a UE in a building, for example. A floor level estimate or an accurate indoors altitude of the UE can be difficult to determine because, inside buildings the standard vertical pressure gradient model can be inaccurate due to the effects of, for example, fan-powered ventilation and air conditioning systems, a naturally occurring stack-effect and smoke control systems that involve deliberate pressurization of indoors areas such as staircases to keep fire exit routes smoke-free.

These deviations from standard atmospheric model predictions can lead to large errors in UE altitude estimations in indoors environments. The errors can be up to tens of metres in magnitude and thus at least one or more floor levels. Furthermore, the actual relationship between pressure and altitude indoors is building—dependent and can be highly variable in time in one or more of: the short-term (e.g. minutes); the medium-term (e.g. hours)' and the long term (e.g. weeks and months). To reliably determine a floor level within a building, the desirable accuracy of an estimated altitude may be less than about ±1 or 2 metres.

One standard model of the atmosphere that may be used by embodiments is based on a subset of an International Standard Atmosphere (ISA) model formulated by the International Civil Aviation Organization (ICAO). The main assumptions of the ISA model are hydrostatic equilibrium, perfect gas, gravity independent of altitude, and constant lapse rate. Zero altitude is measured from mean sea level, which is defined in terms of the gravitational potential energy. One derivation of the ISA model is described in the paper entitled "A Quick Derivation relating altitude to air pressure" Version 1.03 of 22 Dec. 2004 published by the Portland State Aerospace Society and available via the website http://www.psas.pdx.edu.

The lapse rate is defined as the rate of temperature increase in the atmosphere with increasing altitude. For the ISA standard atmospheric model, the lapse rate near the ground is assumed to be −6.5° C. per 1000 m, where the negative sign indicates a decrease of temperature with altitude.

The ISA model assumes a constant lapse rate between 0 and 11 km altitude. The upper bound marks the beginning of the stratosphere, where the atmospheric temperature becomes relatively constant with respect to altitude.

| Symbol | Value | SI Unit | Description |
|---|---|---|---|
| $P_0$ | 101325 | Pa | Pressure at zero altitude |
| $T_0$ | 288.15 | K | Temperature at zero altitude |
| g | 9.80665 | m/s$^2$ | Acceleration due to gravity |
| L | −6.5 × 10$^3$ | K/m | Lapse rate |
| R | 287.053 | J/(kg K) | Gas constant for air |

The ISA model formula is derived based on the assumption that in hydrostatic equilibrium, a change in pressure over an infinitesimal change in altitude opposes the gravitational force on the air in that infinitesimal layer. This gives a formula for altitude, z, in terms of a measured pressure value, P as:

$$z == \frac{T_0}{L}\left(\left(\frac{P}{P0}\right)^{-LR/g} - 1\right) \quad \text{(equation 1)}$$

Embodiments may use this ISA atmospheric model equation (1), adapted according to a set of building-specific indoors pressure measurements at different spatial co-ordinates (e.g. different altitudes) to provide more accurate estimates of indoors locations of UEs by estimating a building-specific pressure-altitude variation model.

FIG. 1 schematically illustrate illustrates a UE 100 incorporating a GNSS chip 110 according to one embodiment. The GNSS chip 110 comprises a receiver 112 for receiving a wireless communication signal 105 including pressure parameter data corresponding to indoors pressure measurements from respective indoors pressure measurement units (not shown). The receiver 112 receives the signal 105, having the pressure parameter data and supplies the incoming signal to a decoder 114 to decode the signal and to enable a processor 116 to extract the pressure parameter data.

The UE 100 also has an antenna arrangement 102 arranged to perform wireless communication. Only one antenna 102 is shown, but this is representative of an antenna arrangement capable of communicating at LTE frequencies and also capable of performing Wi-Fi communication and/or Bluetooth communication. This means that a range of frequencies are covered by the antenna arrangement 102, for example LTE frequencies may range from 800 MHz up to 2.5 GHz whilst Wi-Fi may operate at 2.4 or 2.5 GHz and Bluetooth may operate at 2.4 GHz. Different individual antennae may be provided to transmit and receive different frequencies in this range and dedicated LTE, Bluetooth and Wi-Fi antennae may be provided. The processor 116 comprising a set of indoors altitude computation circuitry 118 makes use of the decoded pressure parameter data together with a local pressure measurement from a pressure sensor 120 of the UE 100 to calculate a current indoors altitude of the UE 100.

A memory 130 accessible to the GNSS chip 110, the memory 130 comprises a module 132 of program instructions for calculating the indoors altitude based upon the received pressure parameters data and the local pressure measurement performed by the UE 100. The UE 100 has the capability to calculate the indoors altitude using its own processor 116 as required. For example, where the pressure parameter(s) data comprise two or more indoors pressure measurement values performed by indoors pressure measurement units (see FIG. 3 and FIG. 6), this UE-based indoors altitude calculation may be based upon either a bespoke indoors pressure-altitude variation formula derived depending upon the pressure measurement values or based at least in part upon as the ISA model described by equation (1) above (e.g. by modifying and/or adding parameters of that equation to suit the particular indoors environment).

The receiver 112 is arranged to receive the pressure parameter data corresponding to repeated measurements (periodic in time or otherwise) and to store at least a subset of the decoded pressure parameters in the UE memory 130. The pressure parameters data may be received via a downlink wireless communication signal such as an LTE signal or via a different type of wireless communication signal such as a Wi-Fi signal, a Bluetooth low energy signal or in an ultra-wideband signal, for example.

The indoors altitude computation circuitry 118 is arranged to calculate a UE altitude and to output a signal 141 corresponding to a UE altitude result in the event that a position fix for the UE is required. The position fix may be required, for example, by the network for the purpose of indoors location services, for radio resource management control or may alternatively be required by a user program application on the UE that provides location-dependent functionality. The UE 100 may optionally be provided with a temperature sensor 140 and temperature measurements may also be used to fine-tune the indoors altitude computation or used as a separate temperature estimate.

Figure 2:
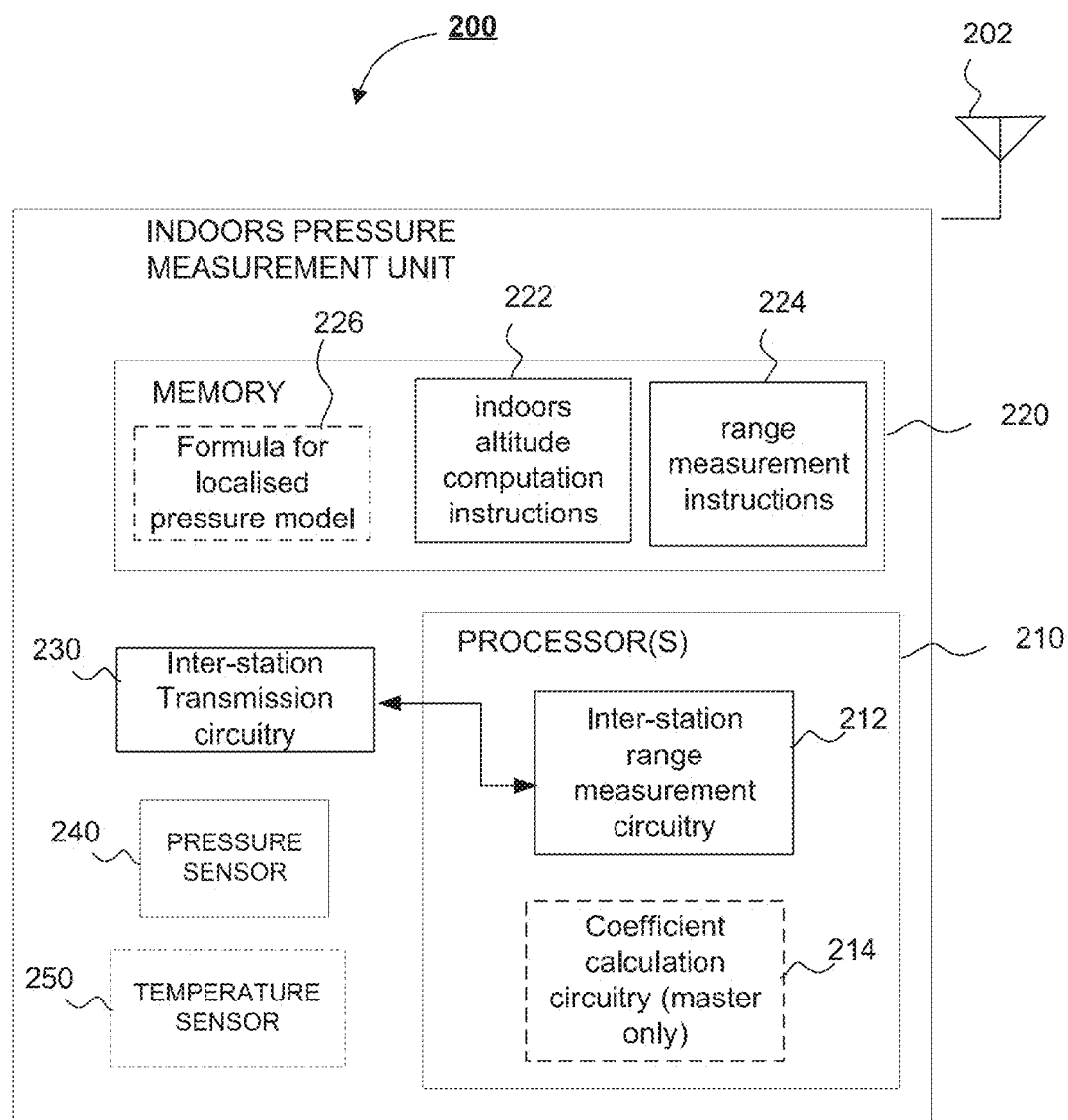
FIG. 2 schematically illustrates an indoors pressure measurement unit according to one embodiment.

FIG. 2 schematically illustrates an indoors pressure measurement unit 200 according to one embodiment. The indoors pressure measurement unit 200 comprises an antenna 202 for receiving wireless communication signals. It also comprises one or more processors 210 having inter-station range measurement circuitry 212 and optionally, having coefficient calculation circuitry 214 arranged to calculate coefficients to modify or define a formula for an indoors pressure-altitude variation. A memory 220 is provided comprising a module 222 of indoors altitude computation program instructions and a module 224 of range measurement program instructions. The range measurement instructions of the module 224 enable the processor(s) 210 to calculate at least a vertical displacement between respective pressure measurement units (see FIG. 3 and FIG. 6) based upon, for example, a time-of-flight measurement on a range-probing wireless signal or "beacon" signal. The beacon signal may comprise one or more dedicated reference symbols.

The memory 220 optionally comprises a formula 226 for a localised pressure model defining an equation specifying an indoors variation of pressure with altitude. This formula may rely in part upon the ISA atmospheric model equation 1, but may also incorporate one or more coefficients to modify the particular pressure-altitude variation according to the local indoors environment. The formula 226 for the localised pressure model and the coefficient calculation circuitry 214 may be provided and only a subset of pressure measurement units. In particular, the modules 214 and 226 may be provided in only in "master" pressure measurement units arranged to receive local pressure measurements from a network comprising one or more slave pressure measurement units. The master units collate information from a set of slave units in the same indoors environment and perform calculations on their behalf.

The indoors pressure measurement unit 200 further comprises a set of inter-station transmission circuitry 230, which is arranged to cooperate with the inter-station range measurement circuitry 212 to determine at least an altitude difference (i.e. a distance along a z-axis direction) between the given pressure measurement unit 200 and respective different pressure measurement units (not shown) in the same indoors environment being modelled. The altitude difference may be determined based upon at least partial prior knowledge of the location of the pressure measurement units within a given indoors environment. For example, approximate x-y (horizontal plane) locations of at least some of the units may be known. The inter-station transmission circuitry 230 may use standard wireless cellular communication signals such as LTE signals, Wi-Fi signals or Bluetooth signals.

To determine a range (e.g. a vertical distance) between two or more indoors pressure measurement units, a Wi-Fi or Bluetooth signal can be transmitted from one indoors pressure unit to another and a strength measurement at the receiving unit can provide a range estimate. However, it can be difficult to distinguish between diminished signal strength due to distance and diminished signal strength due to signal deflections/reflections due to obstructions in a signal path. Wi-Fi signals and Bluetooth signals can be used for indoor-location of UEs by measuring signal strength. Algorithms to calculate time of flight or time of arrival of Wi-Fi signals can be used to improve an accuracy of the distance/range measurement relative to the received signal strength method, but this may require modifications to standard Wi-Fi hardware and it can be difficult to measure precisely the time at which a Wi-Fi or Bluetooth radio signal arrives at its destination pressure unit (receiver of ranging signal) due to the sinusoidal signature of the radio wave and due to signal distortions from noise and/or multipath interference.

To alleviate these potential difficulties, the inter-station transmission circuitry 230 may use Ultra-Wideband (UWB) communication. The UWB communication may share an antenna 202 with the LTE signals or could be provided with a dedicated antenna. UWB communication occupies a wide bandwidth such as many Gigahertz and this enables it to carry data rates of Gigabits per second. The UWB communication may operate in a range from 3.1 to 10.6 GHz and transmissions may occupy a bandwidth of at least 500 MHz and at least 20% of the centre frequency. This can provide good channel capacity at short range with limited interference. One UWB technology known as carrier free direct sequence UWB technology may transmit a series of short impulses so that the short duration leads to a wide bandwidth signal. Another UWB technology known as multi-band OFDM ultra-wideband technology uses a multiband Orthogonal Frequency Division Multiplex (OFDM) signal that is equivalent to a 500 MHz OFDM signal and uses frequency hopping so that the signal occupies a required high bandwidth. An Institute of Electrical and Electronic Engineers (IEEE) standard 802.15.4-2011 is one example of an UWB standard using radio waves with impulse transmissions that are very short in comparison to narrowband communications such as an LTE, Wi-Fi or Bluetooth signal. Embodiments may implement any of these UWB technologies, for example.

The short impulse characteristic of a UWB signal with sharp rises and falls in the signal impulse makes a start and stop point of the signal inherently easier to measure relative to a narrowband signal. This means that a distance between two UWB devices can be accurately measured by measuring a time taken for a UWB radio wave to pass between two UWB-capable devices (such as two indoors pressure measurement units). This is a so-called "time of flight" measurement. UWB signals have the further advantage relative to narrowband signals that the UWB signals are less susceptible to distortion arising from noise and multi-path effects.

UWB signals can measure a distance between two devices to within an accuracy of 5-10 cm, which is likely to be a greater accuracy than achievable via Bluetooth or Wi-Fi. In some embodiments, the inter-station range measurement circuitry 212 uses Wi-Fi technology to provide the ranging functionality and the inter-station transmission circuitry 230 also uses Wi-Fi technology to perform the communication with the other pressure measurement units. In alternative embodiments, both the communication and the inter-station ranging functionality provided in combination by the inter-station transmission circuitry 230 and the interstation range measurement circuitry 212 is provided by UWB technology. In one such UWB embodiment a "DecaWave DW1000" chip may be implemented.

Similarly to the UE 100 of FIG. 1, the local pressure measurement unit 200 comprises a pressure sensor 240 to perform (repeatedly) the local pressure measurement at the location where the pressure measurement unit is installed and may optionally have a temperature sensor 250 to provide local temperature data. The local pressure measurement unit 200 is located at a fixed location in the indoors environment (although it could potentially be moved, for example, to reconfigure the indoors pressure measurement network system), which is in contrast to the UE 100 that is mobile and has a dynamically changing location depending upon movements of the user.

Figure 3:
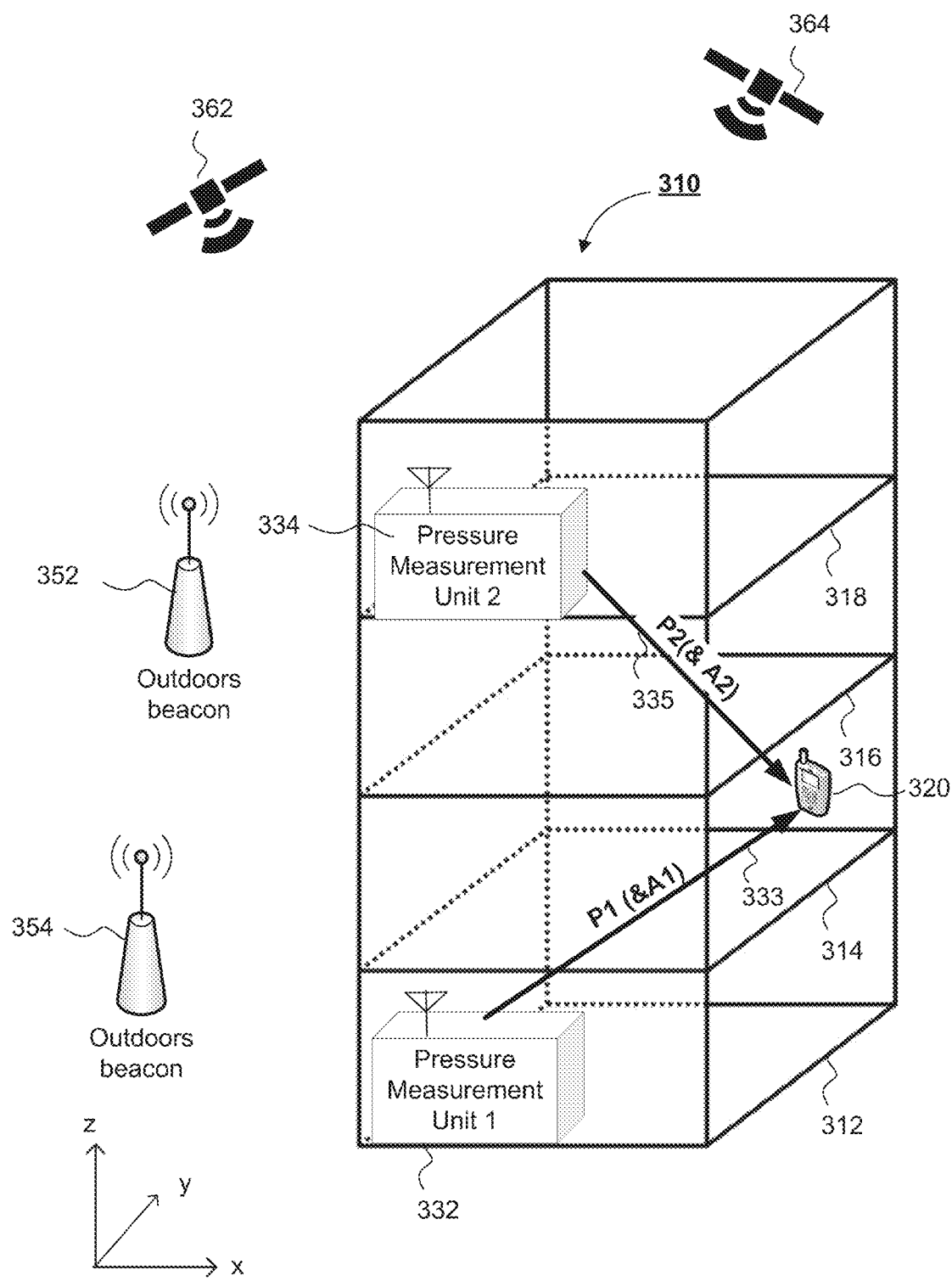
FIG. 3 schematically illustrates a first embodiment of an indoors pressure-altitude determining system in which a plurality of indoors pressure measurement values are transmitted to a UE.

FIG. 3 schematically illustrates a first indoors pressure-altitude model determining system in which a plurality of indoors pressure measurement values are transmitted to a UE. FIG. 3 shows a building 310, having four floors comprising: a ground floor 312, a first floor 314, a second floor 316 and a third floor 318. A UE 320 is currently located on the second floor 314. A first indoors pressure measurement unit 332 is located in a corner of the ground floor 312, whilst a second pressure measurement unit 334 is located in a corresponding corner of the third floor 318. In this embodiment, the absolute locations of the two pressure measurement unit 332, 334 are known by the system in advance, so that each respective pressure measurement unit has a local record of its altitude. Each pressure measurement unit repeatedly measures (e.g. every 5 or 10 minutes) the local pressure at its indoors location and broadcasts the local pressure measurements to any UEs within wireless range. In particular, the first pressure measurement unit 332 sends a signal 333 to the UE 320 including a local pressure measurement value performed by the unit's 332 pressure sensor. Similarly, the second pressure measurement unit 334 sends a signal 335 to the UE 320 on a broadcast wireless channel including a pressure measurement value corresponding to the unit's 344 location on the third floor 318 of the building 310.

The signals 333 and 335 in this embodiment also include altitude values (e.g. read from memory) corresponding to the respective locations of the pressure measurement units. When an indoor location is required by the UE 320, it performs a local pressure measurement using its local pressure sensor (see sensor 120 in FIG. 1) and performs a calculation to determine its altitude based upon an indoors model for pressure-altitude variation based upon the pressure measurement values in the received signals 333, 335. In the simplest case, an interpolation may be performed between pressure and altitude values P1 and A1 on the ground floor measured by the pressure measurement unit 332 and the pressure and altitude values P2 and A2 measured on the third floor by the pressure measurement unit 334. The UE 320 may locally measure a pressure value that lies between the values P1 (higher pressure) and P2 (lower pressure) and a corresponding altitude of the UE may be interpolated between the two end points. In a more detailed calculation of an alternative embodiment, to determine a current UE altitude, the values P1, P2, A1 and A2 may be used to modify a pressure versus altitude curve corresponding to a graph of pressure versus altitude (or vice versa) described by the ISA model formula of equation 1 above.

Although the absolute altitudes of the pressure measurement unit 332, 334 may be determined prior to the indoors location determining system being deployed, in some embodiments the relative altitudes of the two pressure measurement unit 332, 334 are determined in situ by the pressure measurement units themselves by measuring the distances between them. In this simple arrangement, where the x and y coordinates of the pressure management pressure measurement units are approximately equal to each other, the relative altitudes of the two pressure measurement units may be determined by a single range measurement comprising, for example a time-of-flight Wi-Fi ranging measurement or a time of flight UWB ranging measurement. The absolute altitude of the pressure measurement unit 332 can be determined based on the fact that it is located at ground level.

If the local pressure measurement units 332, 334 were displaced relative to each other in the horizontal plane, further measurements would likely to be needed to accurately locate their (x, y, z) coordinates. This could be performed similarly to the 3-D trilateration performed by global positioning satellite (GPS) systems to determine the location of a device having a GPS receiver. In particular, ranging measurements performed by sending ranging signals to a given target indoors pressure unit from each of at least three pressure measurement units may be used to define for each of the signal-originating pressure units a sphere on the surface of which the target indoors pressure unit may be located. An intersection point of the three or more spheres will correspond to the target pressure unit position. This trilateration calculation is the most complex calculation in which none of the (x,y,z) coordinates of the target indoors pressure measurement units known. However, often absolute altitudes of at least a subset of the indoors pressure measurement units may be known and also approximate x and/or y coordinates corresponding to the horizontal plane locations of the indoors pressure measurement units may also be known. Having prior knowledge of at least some configuration details of the indoors location measurement system simplifies the ranging calculation and measurements to be performed by the inter-station range measurement circuitry 212 shown in FIG. 2.

The system of FIG. 3, in addition to the indoors pressure measurement unit 332, 334 according to embodiments, also shows first and second outdoors beacons 352 and 354 forming part of a wide-area location system in general. The general system also incorporates two GNSS satellites 362, 364. The two outdoors beacons 352 and 354 correspond to outdoors reference pressure stations. The outdoors stations may provide a network of one or more stations located for example at a frequency of one per city or one every couple of kilometres and may provide a facility to locally measure outdoors pressure (and optionally a temperature) at the respective beacon site. The pressure may be measured repeatedly at the beacon location and the beacon can have a known altitude and optionally a known horizontal location, which can be transmitted to UEs. These outdoors beacons may all be located at ground level. Apart from the local outdoors pressure measurements, the outdoors beacons 352, 354 may also be arranged to transmit other signals for use by UEs in estimating vertical and/or horizontal positions. Examples of other signals transmitted by the beacons are GNSS-like signals or Wi-Fi time-of-flight signals or UWB time-of-flight signals. The GNSS satellites 362, 364 and outdoors beacons 352, 354 are provided in only some embodiments because the indoors pressure units 352, 354 are capable of providing accurate indoors altitude measurements without requiring the outdoors beacons 352, 354.

The outdoors beacons 352, 354 are arranged to transmit GNSS-like signals at relatively high signal strength, which can allow UEs to compute their horizontal position in indoor environments more accurate accurately than is possible using GNSS alone. The outdoors beacons 352, 354 may also act as reference pressure stations transmitting a reference outdoors pressure value to users who can then estimate their current altitude from their own local measurement of atmospheric pressure. Provision of the outdoors beacons 352, 354 in addition to the indoors pressure measurement unit 332, 334 allows information to be disseminated to the user including details of a variation of pressure between the outside and inside of the building as well as details of the variation of pressure within the building itself (obtained from the indoors pressure measurement units 332, 334).

Previously known systems such as those developed by the company "NextNav" provide widely spaced outdoors beacons that use only a standard vertical gradient pressure model such as equation (1) above. They do not take into account real-time measurement and estimation of indoors pressures, nor do they provide for modelling of variation of atmospheric pressure within a specific indoors environment such as a building, the modelled variation being particularly in the vertical dimension (z-axis) but potentially in all three spatial dimensions (including x-axis and y-axis). Embodiments provide for real-time dissemination of this information to UEs in the indoors environment. The UE's make use locally measured indoors pressure values from the pressure measurement units 332, 334 instead of, or as well as, using a standard model of the vertical variation of pressure with altitude, together with their own local indoors pressure measurement. This allows the UEs to compute their respective altitudes more accurately than would otherwise be the case with the outdoors beacons 352, 354 alone.

The indoors pressure measurement units 332, 334 provide for a level of accuracy that allows the user to differentiate between different floor levels in a more reliable way and with more certainty that would otherwise be the case. The optional use of ranging between the indoors pressure measurement unit 332, 334 using UWB or a Wi-Fi time-of-flight technology allows more accurate relative locations of the indoors pressure measurement units to be determined, at least in the vertical direction (z-axis). The ranging measurement facility allows for more efficient expansion or modification of the altitude-determining network over time allowing for greater accuracy to be provided.

Figure 4:
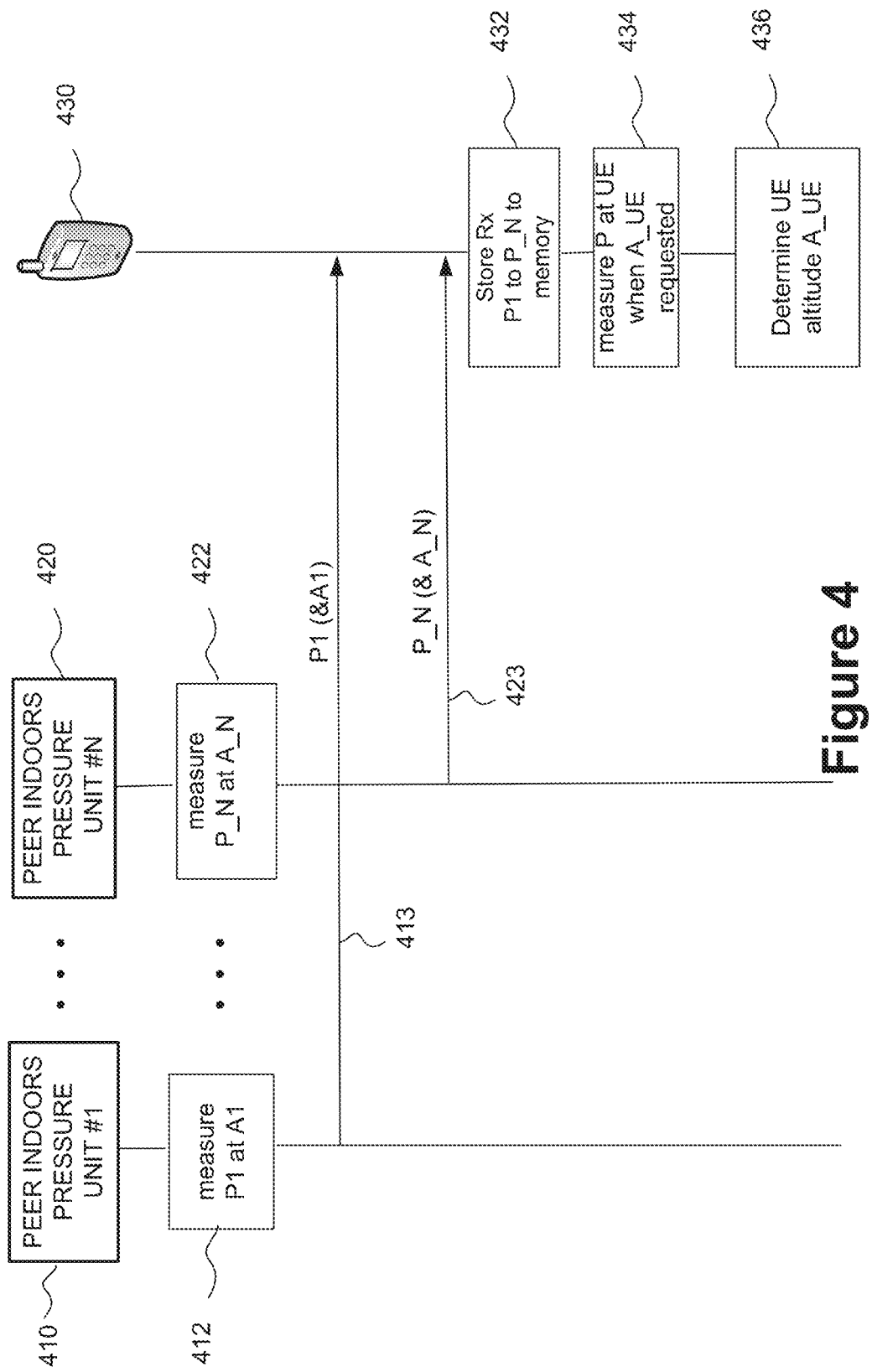
FIG. 4 is a signal diagram showing communication of signals in the indoors location system of the FIG. 3 embodiment.

FIG. 4 is a signal diagram showing communication of signals in the indoors location system of FIG. 3. As shown in FIG. 4, in this arrangement the indoors pressure measurement units operate at the same level of hierarchy in the system and have therefore been denoted as "peer" pressure measurement units 410 and 420. Although only two peer pressure measurement units are shown, any number of peer pressure measurement units may be provided as required to perform the indoors altitude determination. The peer pressure measurement units 410 and 420 communicate with a UE 430. The first peer pressure measurement unit 410 performs a local pressure measurement at a functional block 412 to obtain a value P1 at an altitude of A1. At the same time or at a similar time, the peer pressure measurement unit # N 420 performs at a functional block 422, a pressure measurement P_N at altitude A_N. The first peer pressure measurement unit 410 sends a signal 413 to the UE 430 containing values P1 and A1 and the second peer pressure measurement unit # N 420 sends a signal 423 containing values P_N and A_N to the UE 430. At a functional block 432 upon receipt of the two sets of measurement values in signals 413 and 423, the UE stores the received local pressure measurements and corresponding altitudes to memory and then at element 434, when required, the UE 430 measures the local pressure at the UE using its local pressure measurement sensor 120 (see FIG. 1). Finally, at a functional block 436, the UE determines a current indoors altitude value A_UE based upon: (i) the received pressure measurement data from the peer pressure measurement units 410, 420; (ii) a local indoors model of pressure-altitude variation calculated depending upon this data; and (iii) the pressure measured locally at the UE.

Figure 5:
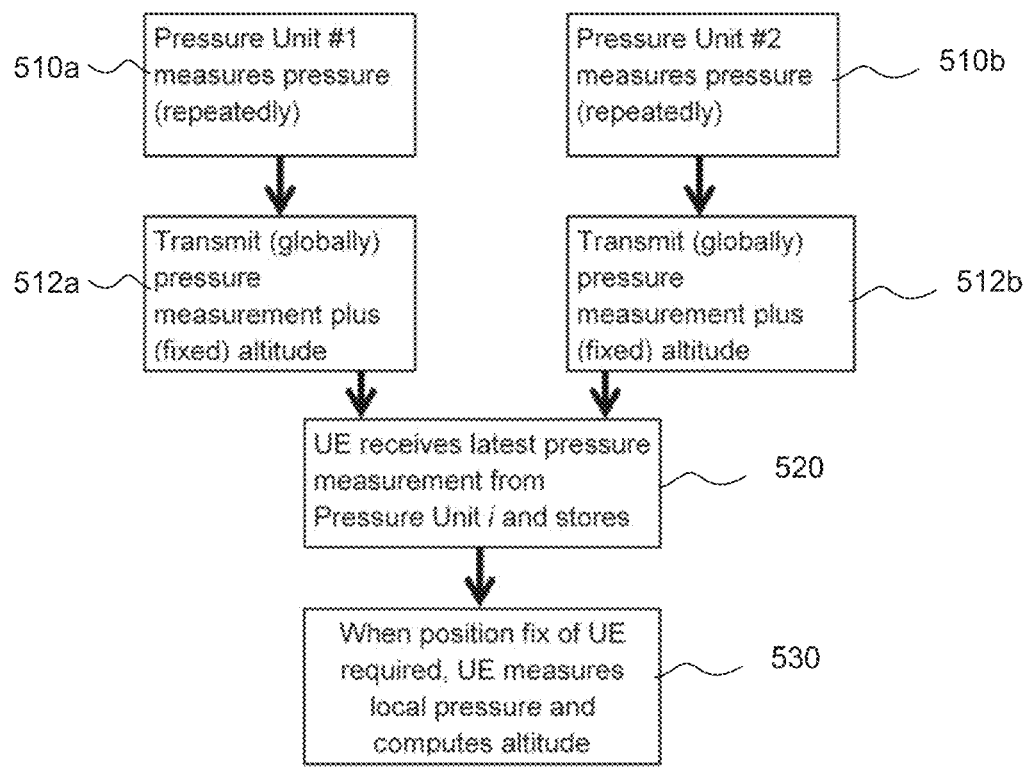
FIG. 5 is a flowchart that schematically illustrates an indoors altitude determination for a UE, performed by the system of the embodiment of FIG. 3.

FIG. 5 is a flowchart that schematically illustrates an indoors altitude measurement performed by the system of the embodiment of FIG. 3. For simplicity, only two indoors pressure measurement units have been illustrated, although more units may be provided in alternative embodiments. At a functional block 510a, a pressure unit #1 repeatedly measures a local indoors pressure and a parallel local pressure measurement is performed repeatedly at successive times by a pressure unit #2 at a functional block 510b. At functional blocks 512a and 512b, the first and second pressure measurement units respectively perform transmission of the most recent pressure measurement together with a corresponding altitude associated with an indoors location of the corresponding pressure unit. Next, at a functional block 520, a UE that is located in the indoors environment receives broadcast data containing the local pressure measurements from the indoors pressure units #1 and #2 and stores those values in local memory for subsequent use. Finally, at a functional block 530, when a position fix is required of the UE, the UE measures a local pressure at its current location and calculates its own altitude locally at the UE using the appropriate indoors pressure-altitude variation model adapted according to the most recently received pressure measurement values from the set of indoors pressure measurement units.

Figure 6:
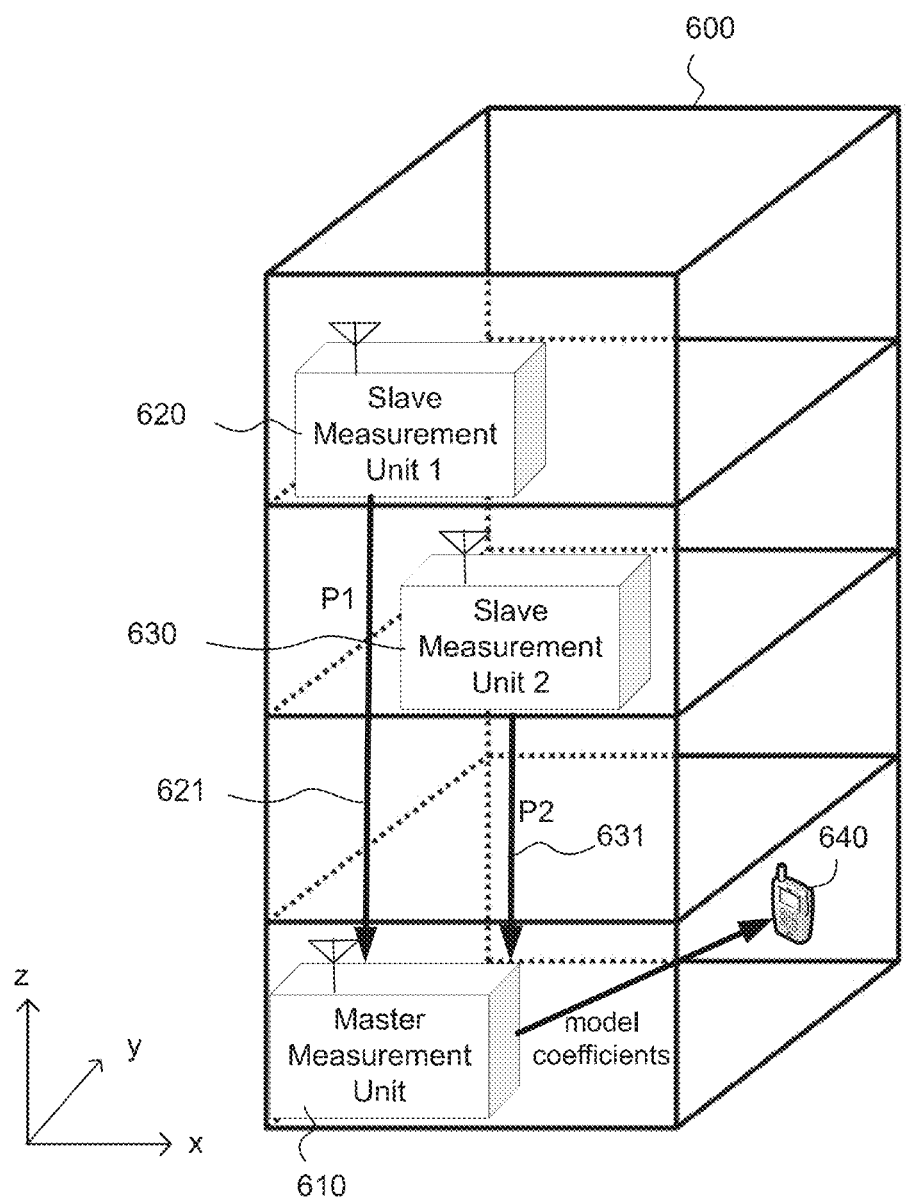
FIG. 6 schematically illustrates a second embodiment of an indoors pressure-altitude determining system, in which a master indoors pressure measurement unit and one or more slave indoors pressure measurement units are provided.

FIG. 6 schematically illustrates an alternative embodiment of an indoors altitude determining system in which a master indoors pressure measurement unit and two slave indoors pressure measurement units are provided. Similarly to the arrangement of FIG. 3, the building 600 comprises four different floor levels. However, in this arrangement, a master pressure measurement unit 610 is provided on the ground floor and a first slave measurement unit 620 is provided on the third floor whilst second slave measurement unit 630 is provided on the second floor of the building. A UE 640 in this example embodiment is located on the ground floor.

Instead of each indoors pressure measurement unit providing a pressure measurement value directly to the UE 640 as was the case in the embodiment of FIG. 3, in this alternative embodiment the first slave measurement unit 620 supplies its pressure measurement value P1 via a signal 621 to the master measurement unit 610 and the second slave measurement unit 630 provides a signal 631 containing its local pressure measurement value P2 to the master measurement unit 610. The master measurement unit 610 collates the local pressure measurement values P1, P2 and also collates corresponding altitude values A1, A2 (determined in advance and/or via ranging measurements) to calculate a building-specific pressure-altitude variation model for use in calculating a current altitude of the UE 640.

The master measurement unit 610 calculates one or more model coefficients corresponding to a building-specific pressure-altitude variation model and supplies these coefficients to the UE 640. The UE 640 then inserts the received model coefficients into a mathematical formula stored in its local memory and uses these coefficients together with a pressure measurement performed locally at the UE 640 to determine current altitude of the UE as required.

Similarly to the arrangement of FIG. 3, the signals communicating the local indoors pressure measurement values 621, 631 may also include corresponding altitude values. However, the altitude values may not be needed if the configuration is at least semi-static and the slave measurement unit locations are stored in memory at the master measurement unit 610. In some embodiments, the absolute altitude of one or more indoors pressure units may be known before deployment of the system, for example those units located on the ground floor only, and the relative altitudes between all the stations may be determined using the inter-station range measurement circuitry 212 and range measurement instructions 224.

Figure 7:
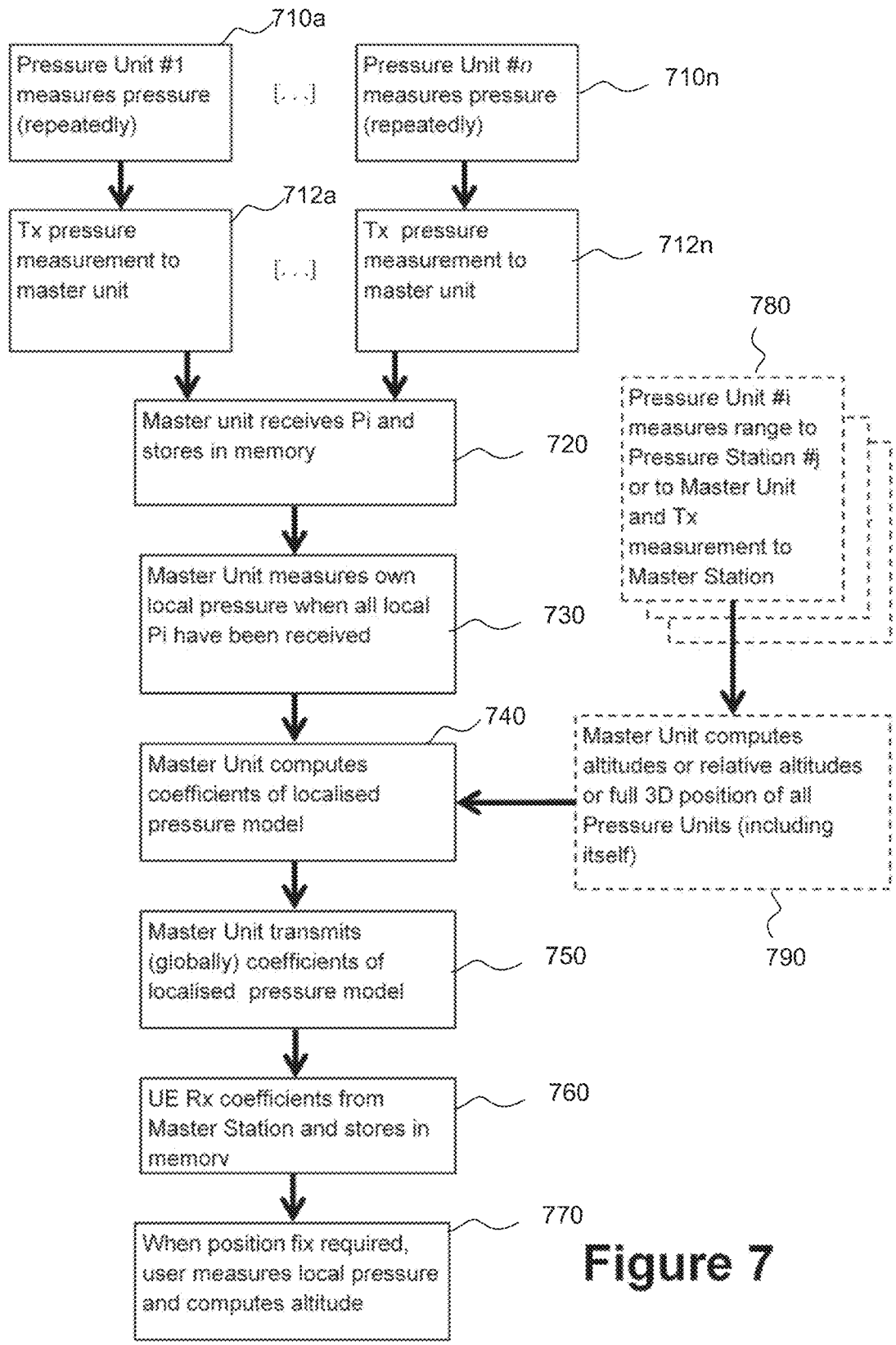
FIG. 7 is a flowchart that schematically illustrates method performed by an indoors altitude determining system for a UE according to the second embodiment of FIG. 6.

FIG. 7 is a flowchart that schematically illustrates method performed by an indoors altitude determining system according to the embodiment of FIG. 6. A total of "n" slave indoors pressure measurement units are provided in the system. At functional blocks 710a to 710n, the slave indoors pressure measurement units respectively perform pressure measurement values repeatedly and at subsequent functional block 712a to 712n, parallel transmissions are performed by individual indoors slave pressure units respectively to broadcast their pressure measurement values to any UE in the indoors environment. At functional block 720, a master indoors pressure measurement unit receives the plurality of indoors pressure measurement values and stores them in memory. At functional block 730, having already received the local pressure measurements from the slave pressure measurement units, the master indoors pressure measurement unit measures its own local pressure and computes coefficients of a localised pressure-altitude variation model that is specially adapted to the particular indoors environment. At process element 750 the master pressure measurement unit globally transmits coefficients of localised pressure model to all UEs in the vicinity.

At functional block 760, an individual UE receives coefficients from the master station and stores them in memory ready for subsequent use. Finally at functional block 770, whenever a position fix is required for the UE, the UE initiates measurement of the local pressure using its own pressure sensor and computes an accurate altitude value depending upon a pressure-altitude variation formula into which the coefficient stored at process element 760 are inserted.

Although in the FIG. 7 embodiment the current altitude of the UE is calculated locally at the UE based upon one or more coefficients received from the master pressure measurement unit, in other embodiments the current local pressure at the UE could be transmitted, for example, to the master-pressure measurement unit, where the calculation to determine the current altitude of the UE could be performed.

The additional process elements 780 and 790 illustrated in FIG. 7 are optional as they are provided in only some embodiments. At functional block 780, individual slave pressure measurement units measure a range (distance) to another slave indoors pressure measurement unit or to the master pressure measurement unit and the resulting range measurement is transmitted to the master station for processing. At functional block 790, the master unit computes the altitudes or relative altitudes or a full three-dimensional position of all of the indoors pressure measurement units including itself. The altitudes only or alternatively the full three-dimensional positions of the indoors pressure measurement units may be supplied as input to the functional block 740, where they are used in computation of the coefficients of the localised indoor pressure-altitude variation model.

Figure 8:
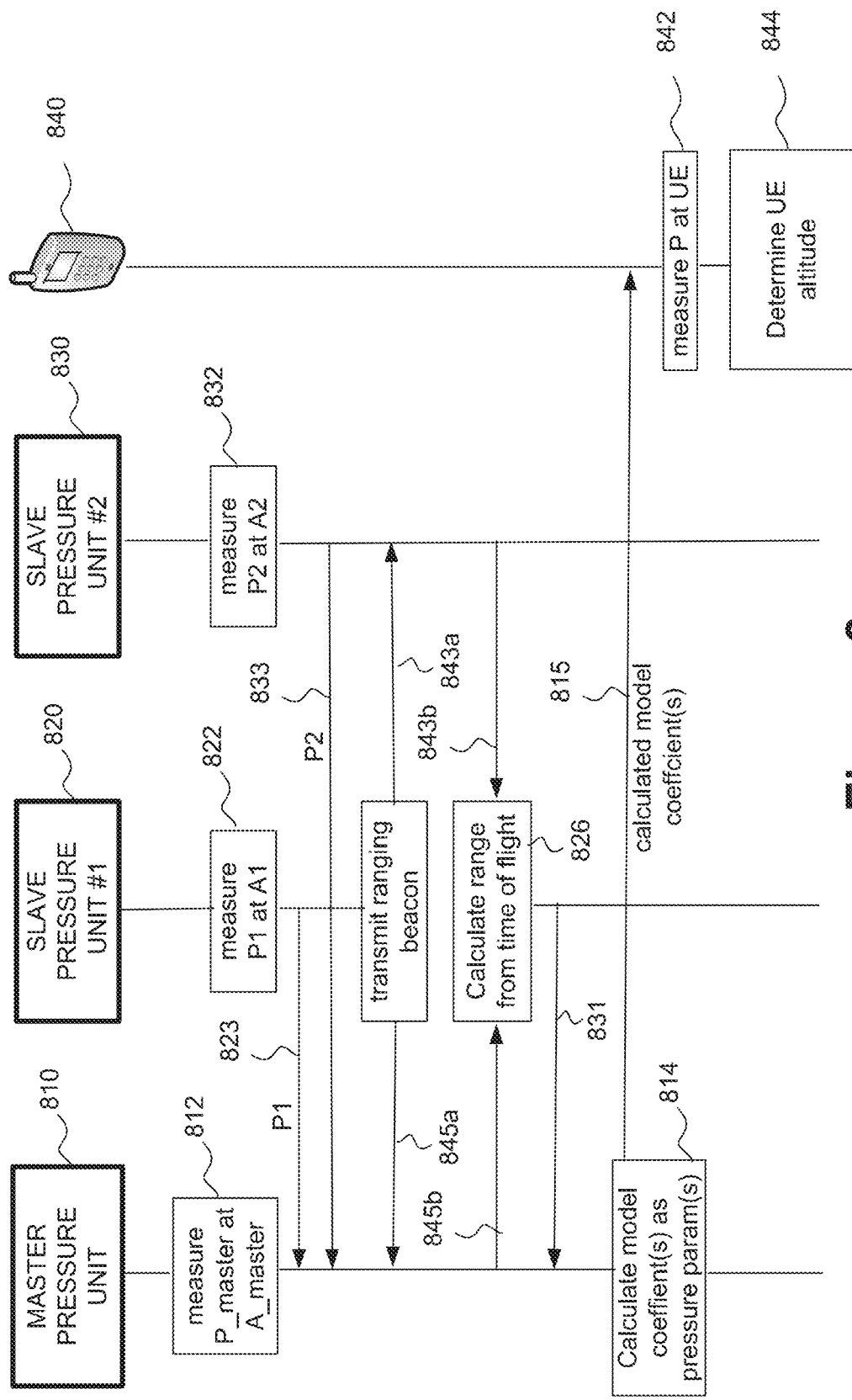
FIG. 8 is a signal diagram showing signals communicated between a plurality of indoors pressure measurement units and a UE according to the second embodiment of FIG. 6.

FIG. 8 is a signal diagram showing signals communicated between indoors pressure measurement units and a UE in the embodiment of FIG. 6. This signal diagram shows a master pressure unit 810, a first slave pressure unit 820 and a second sleeve pressure unit 830 as well as a UE 840. The master pressure unit 810 performs pressure and altitude measurements corresponding to the master station at box 812, whilst the first and second slave pressure measurement units 820 and 830 perform respective measurements of local pressures at corresponding altitudes at functional block 822 and 832. The first slave pressure measurement unit 820 sends a signal 823 to the master pressure measurement unit 810 containing at least the local pressure measurement P1. Similarly, the second slave pressure measurement unit 830 sends a signal 833 containing at least the pressure measurement P2 to the master pressure measurement unit 810. Subsequently, on the timeline of the first slave pressure measurement unit, a ranging beacon is transmitted to both the master pressure measurement unit 810 and the slave pressure measurement unit 830. This ranging beacon is used to perform at least an altitude determination to determine an altitude difference between the slave pressure unit #1 and each of the master pressure measurement unit 810 and the slave pressure measurement unit #2 830.

The ranging beacon transmission corresponds to a first beacon signal 843a, which is sent from the first slave pressure unit 820 to the second slave pressure unit 830 and the second beacon signal 843b, which is sent from the first slave pressure unit 820 to the master pressure unit 810. Time-of-flight range measurement calculations are performed by the first slave pressure measurement unit 820, which awaits receipt of acknowledgements 843b and 845b of the ranging beacon signals to calculate a time-of-flight to each of the two units 810, 830.

A data radio frame may be used to contain the ranging beacon data whilst an ACK control radio frame may be used for the reply from the beacon receiving pressure unit. The beacon transmitting station (indoors pressure unit 820 in the FIG. 8 example) measures a time $t_{MEAS}(d)$ elapsing from an instant that the data frame is transmitted to an instant that the ACK has been received. For example, time-of-flight may be calculated according to the formula:

$$t_{MEAS}(d) = 2 \cdot t_p(d) + t_{ACK} + t_{OFF,T} + t_{OFF,R} \quad \text{(equation 2)},$$

where $t_p(d)$ is the local propagation time between the first slave pressure measurement unit 820 and the receiving pressure measurement unit 810 or 830, $t_{ACK}$ indicates a duration of an ACK radio frame, $t_{OFF,T}$ is an offset caused by hardware processing and software processing delays at the beacon-transmitting pressure measurement unit 820 and $t_{OFF,R}$ is an offset caused by hardware to the at the beacon-receiving station. Based on the range determining calculation at functional block 826, the first slave pressure measurement unit 820 transmits a signal 831 to the master pressure measurement unit 810 containing range values corresponding to measured distances (ranges) between the master unit 810 and the first slave pressure unit 820 and between the first slave pressure unit 820 and the second slave pressure unit 830. The range values may be used by the master unit 810 to determine absolute altitudes of the two slave pressure units 820, 830. This ranging calculation assumes that an absolute altitude of the master pressure measurement unit 810 is known in advance. Subsequently, on a timeline of the master pressure measurement unit 810, at functional block 814, the master pressure measurement unit 810 calculates model coefficients serving as one or more pressure parameters for the local pressure-altitude variation model and transmits a signal 815 containing the data for the calculated model coefficients to the UE 840. When required by the UE 840 a local pressure measurement is performed and the received model coefficients obtained via the signal 815 are used to determine a local indoors altitude of the UE 840 at functional block 844.

Figure 9:
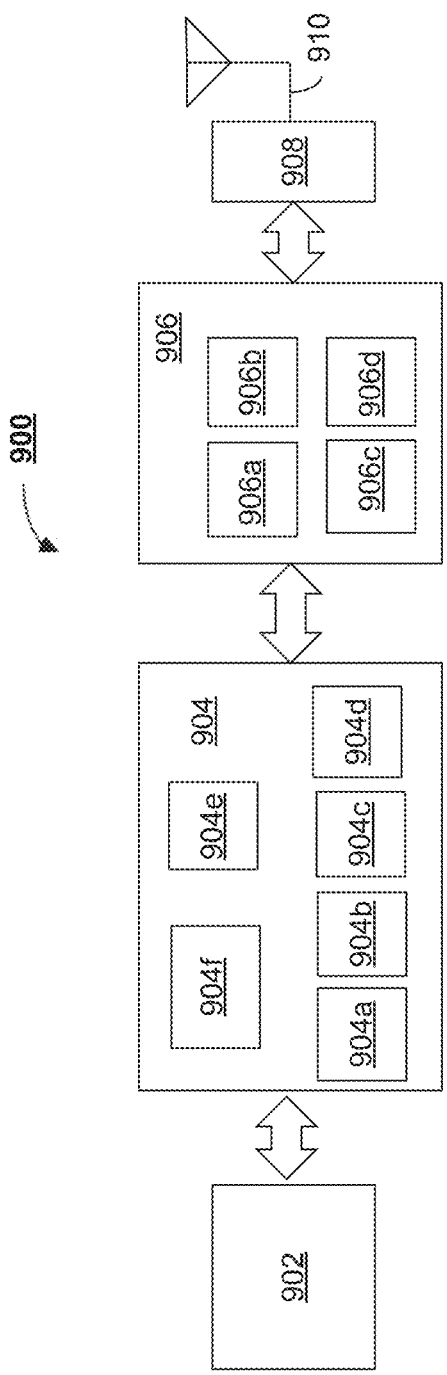
FIG. 9 illustrates, for one embodiment, example components of a UE device.

Embodiments described herein may be implemented into a system using any suitably configured hardware and/or software. FIG. 9 illustrates, for one embodiment, example components of a User Equipment (UE) device 900. In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature down-conversion and/or up-conversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down-conversion and/or direct up-conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display, camera, sensor, and/or input/output (I/O) interface.

In various embodiments, the UE 900 may be a mobile computing device such as, but is not limited to, a laptop computing device, a tablet computing device, a netbook, a mobile phone, etc.

In embodiments, the implemented wireless network may be a 3rd Generation Partnership Project's long term evolution (LTE) advanced wireless communication standard, which may include, but is not limited to releases 8, 9, 10, 11, 12, and 13 or later, of the 3GPP's LTE-A standards.

Various techniques, or certain aspects or portions thereof, may take the form of program code (i.e., machine-readable instructions) embodied in tangible media, such as floppy diskettes, CD-ROMs, hard drives, a transitory (e.g. transmission medium) or non-transitory computer readable storage medium, or any other machine-readable storage medium such that when the program code is loaded into and executed by a machine, such as a computer or one or more processors at one or more processing nodes, the machine becomes an apparatus for practicing the various techniques according to the above described embodiments.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that the functional units described in this specification have been labeled as units or modules or circuitry or logic, to highlight their implementation independence. Note that a module/unit/circuitry may be implemented, for example, as a hardware circuit comprising custom VLSI circuits or gate arrays, off-the-shelf semiconductors such as logic chips, transistors, or other discrete components. A module/unit/circuitry/logic may also be implemented in programmable hardware devices such as field programmable gate arrays, programmable array logic, programmable logic devices or the like. The module/unit/circuitry/logic may be general purpose processor circuitry configured by program code to perform specified processing functions, for example firmware. The module/units/circuitry/logic may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. The modules/units/circuitry may be implemented in logic such as hardware logic elements, combinations of logic elements or other circuit components.

Modules/units/circuitry/logic may also be implemented in software for execution by various types of processors. An identified module or set of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module or a set of executable code may be a single instruction, or many instructions, and may even be distributed over several different code segments, among different programs, and across several memory devices. Similarly, operational data may be identified and illustrated herein within modules, units or circuitry, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

By providing a network of two or more indoors pressure measurement units, embodiments enable determination of a building-specific model of pressure variation with altitude that would otherwise be insufficient due to well-known local effects within the building. Normal atmospheric variations due to, for example whether outside building or if conditioning effect inside a building mean that although not could in principle be derived from a single pressure measurement that measurement is likely to be many tens of metres in error. Accordingly, embodiments determine a pressure difference between two different indoors locations to provide an estimate of a difference in altitude. A relationship between pressure difference and an altitude difference between two or more indoors pressure measurement units can thus be used to define a indoors pressure-altitude variation, which can then be used when an indoors location of a UE is required, at which point a local pressure measurement at the UE can be converted to an altitude using the building-specific pressure-altitude variation model.

In some embodiments ranging circuitry is provided to determine a relative range (for example a distance in metres corresponding to an altitude difference) between respective indoors pressure measurement units. One benefit of implementing ranging between the indoors pressure measurement units is that it then becomes straightforward and efficient to add new pressure measurement units or to move existing pressure measurement unit locations within the building. Movement of the pressure measurement units within the building may be desirable to generate more accurate model of one-dimensional, two-dimensional or three-dimensional variation of pressure in the building as and when it is required. For example, if, for a particular building, it becomes apparent that the pressure variation is particularly complex or variable, then extra pressure measurement units could be readily added to improve the accuracy of the pressure-position variation model.

EXAMPLES

Example 1 may include altitude determining circuitry for use in a User Equipment of a wireless communication network, the altitude determining circuitry comprising:

a receiver to receive at least one pressure parameter representative of a plurality of indoors pressure measurements from a respective plurality of indoors pressure measurement units located inside a building at corresponding measurement-unit altitudes; and processing circuitry to receive from a pressure sensor in the User Equipment a local pressure measurement at the User Equipment and to determine an indoors altitude of the User Equipment using the at least one pressure parameter and the local pressure, wherein the plurality of indoors pressure measurements comprise at least two indoors pressure measurements corresponding respectively to at least two different measurement-unit altitudes.

Example 2 may include the altitude determining circuitry of example 1 or some other example herein, wherein the received at least one pressure parameter comprises values for the at least two indoors pressure measurements and wherein the processing circuitry is arranged to determine the User Equipment altitude using at least one difference between the User Equipment local pressure measurement and the at least two indoors pressure measurement values to determine the User Equipment altitude relative to the measurement-unit altitudes.

Example 3 may include the altitude determining circuitry as claimed in example 2 or some other example herein, wherein a subset comprising at least one of the measurement unit altitudes are absolute altitudes and a complementary subset of the measurement-unit altitudes are relative altitudes.

Example 4 may include the altitude determining circuitry as claimed in example 2 or example 3 or some other example herein, wherein the receiver is arranged to receive an outdoors parameter corresponding to an outdoors pressure measurement made by an outdoors pressure measurement unit and wherein the processing circuitry is arranged to determine the altitude of the User Equipment using the outdoors parameter to determine a variation in pressure between outside the building and inside the building.

Example 5 may include the altitude determining circuitry as claimed in example 1 or some other example herein, wherein the received at least one pressure parameter corresponds to a coefficient of an indoor pressure-altitude variation formula specifying an indoors pressure variation with altitude, the coefficient having been calculated using the plurality of indoors pressure measurements.

Example 6 may include the altitude determining circuitry as claimed in example 5 or some other example herein, wherein the formula coefficient is calculated by an indoors pressure measurement unit acting as a master pressure measurement unit at a master-unit altitude, the master pressure measurement unit arranged to receive pressure measurement values from at least one slave indoors pressure measurement unit having a respective slave-unit altitude(s).

Example 7 may include the altitude determining circuitry as claimed in example 6 or some other example herein, wherein the processing circuitry is arranged to determine the User Equipment altitude by using both the received formula coefficient and the local User Equipment pressure measurement in the indoor pressure-altitude variation formula.

Example 8 may include the altitude determining circuitry as claimed in example 7 or some other example herein, wherein the master-unit altitude and at least one of the slave-unit altitude(s) are different altitudes and wherein the master pressure measurement unit is arranged to use the received pressure measurement values and to use the corresponding master-unit altitude and slave-unit altitude(s) to calculate the formula coefficient.

Example 9 may include the altitude determining circuitry as claimed in any one of examples 6 to 8 or some other example herein, wherein a spatial direction corresponding to altitude is denoted a z-axis direction and wherein the master pressure measurement unit is arranged to receive, via a transmission from at least one of the slave indoors pressure measurement units, a z-axis distance between two given slave indoor pressure measurement units or a z-axis distance between a slave indoor pressure measurement unit and the master pressure measurement unit.

Example 10 may include the altitude determining circuitry as claimed in example 9 or some other example herein, wherein the z-axis distance is calculated by the slave indoors pressure measurement unit from which the indoors pressure measurement was received at the master indoors pressure measurement unit.

Example 11 may include the altitude determining circuitry as claimed in example 8 or some other example herein, wherein the master pressure measurement unit is arranged to receive from at least one of the slave pressure measurement units a reference signal to enable calculation at the master pressure measurement unit of the z-axis distance, the z-axis distance corresponding to an altitude difference between the respective slave indoors pressure measurement unit and the master pressure measurement unit.

Example 12 may include the altitude determining circuitry as claimed in example 10 or example 11 or some other example herein, wherein the master pressure measurement unit is arranged to calculate the formula coefficient using the calculated altitude difference(s).

Example 13 may include the altitude determining circuitry as claimed in any one of examples 1 to 12 or some other example herein, arranged to read at least a subset of the given measurement-unit altitude(s) from a memory based on a predetermined configuration of indoors pressure measurement units.

Example 14 may include the altitude determining circuitry as claimed in any one of examples 1 to 13 or some other example herein, wherein the receiver is arranged to receive the at least one pressure parameter by receiving and decoding one of a Wi-Fi signal and an Ultra-Wideband signal.

Example 15 may include the altitude determining circuitry as claimed in any one of examples 1 to 12 or some other example herein, wherein the processing circuitry is arranged to use at least one of an x-coordinate and a y-coordinate of a spatial position of the respective indoors pressure measurement unit in addition to a z-coordinate corresponding to the measurement-unit altitude to determine at least the current User Equipment altitude.

Example 16 may include a Global Navigation Satellite System integrated circuit for use in a User Equipment, comprising the altitude determining circuitry of any one of examples 1 to 15.

Example 17 may include a User Equipment comprising the altitude determining circuitry of any one of examples 1 to 15 or some other example herein and a pressure sensor for performing the local User Equipment pressure measurement.

Example 18 may include machine executable instructions stored on a machine readable medium, the instructions being arranged upon execution by one or more processors of a User Equipment, to perform calculation of a User Equipment indoors altitude, the machine executable instructions comprising:

code to receive from an indoors pressure measurement unit located at a first altitude inside a building, at least one measurement result corresponding to a plurality of indoors pressure measurements performed by the indoors pressure measurement unit and at least one further pressure measurement unit located at a second, different altitude; and code to receive from a pressure sensor in the User Equipment, a local pressure measurement at the User Equipment and to determine a current indoors altitude of the User Equipment using the received measurement result and the local pressure measurement.

Example 19 may include machine executable instructions as claimed in claim 18, comprising code to determine an altitude difference between the indoors pressure measurement unit and the at least one further pressure measurement unit.

Example 20 may include an indoors pressure measurement unit for performing a pressure measurement to enable calculation of an indoors altitude by a User Equipment of a wireless communications network, the indoors pressure measurement unit comprising:

a pressure sensor for performing a pressure measurement corresponding to an altitude at which the indoors pressure measurement unit is located;

a transmitter to transmit a pressure parameter depending upon the pressure measurement to one of the User Equipment or a further indoors pressure measurement unit, the transmitted pressure parameter enabling determination of an indoors location of the User Equipment using the transmitted pressure parameter and at least a further pressure measurement performed locally at the User Equipment.

Example 21 may include the indoors pressure measurement unit of example 19 or some other example herein, comprising range determination circuitry arranged to determine a vertical distance between the indoors pressure measurement unit and the further indoors pressure measurement unit for use in calculating one or more coefficients of a formula specifying indoor pressure variation with altitude.

Example 22 may include the indoors pressure measurement unit of example 20 or some other example herein, wherein the range determination circuitry is arranged to determine the vertical distance between the indoors pressure measurement unit and the further indoors pressure measurement unit using a time-of-flight measurement of a Wi-Fi signal transmitted between the indoors pressure measurement unit and the further indoors pressure measurement unit.

Example 23 may include the indoors pressure measurement unit of example 21 or some other example herein, wherein the transmitter comprises Ultra-Wideband processing circuitry and wherein the range determination circuitry is arranged to determine the distance between the indoors pressure measurement unit and the further indoors pressure measurement unit using one or more Ultra-Wideband signals.

Example 24 may include the indoors pressure measurement unit of example 23 or some other example herein, wherein the transmitter is arranged to transmit the pressure parameter using an Ultra-Wideband transmission signal.

Example 25 may include the indoors pressure measurement unit of example 20 or some other example herein, implemented as a master pressure measurement unit for receiving pressure measurements from one or more slave pressure measurement units at respective different spatial coordinates, the master pressure measurement unit having processing circuitry to determine using the received pressure measurements and the pressure measurement performed by the pressure sensor, at least one coefficient of a formula specifying indoor pressure variation with altitude and wherein the transmitted pressure parameter is the formula coefficient.

Example 26 may include the indoors pressure measurement unit of example 25 or some other example herein, wherein the formula specifying indoor pressure variation with altitude also specifies indoor pressure variation with regard to an x-y plane of a building corresponding to the indoors location and wherein at least a subset of x-coordinates and y-coordinates of the one or more slave pressure measurement units are used to determine the formula coefficient.

Example 27 may include the indoors pressure measurement unit of example 20 or some other example herein, implemented as a slave pressure measurement unit arranged to transmit a pressure measurement value as the pressure parameter to a master pressure measurement unit, wherein the master pressure measurement unit uses the pressure parameter from the slave pressure management unit to calculate a coefficient of a formula specifying indoor pressure variation with altitude.

Example 28 may include a system for determining an indoors altitude of a User Equipment of a wireless communications network, the system comprising:
the User Equipment as specified in example 17 or some other example herein; and
at least one indoors pressure measurement unit as specified in any one of examples 20 to 27 or some other example herein.

Example 29 may include means for determining altitude for use in a User Equipment of a wireless communication network, the means for determining altitude comprising:
means for receiving at least one pressure parameter representative of a plurality of indoors pressure measurements from a respective plurality of indoors pressure measurement units located inside a building at corresponding measurement-unit altitudes; and
means for receiving from a pressure sensor in the User Equipment a local pressure measurement at the User Equipment and to determine an indoors altitude of the User Equipment using the at least one pressure parameter and the local pressure, wherein the plurality of indoors pressure measurements comprise at least two indoors pressure measurements corresponding respectively to at least two different measurement-unit altitudes.

Example 30 may include means for indoors pressure measurement for performing a pressure measurement to enable calculation of an indoors altitude by a User Equipment of a wireless communications network, the means for indoors pressure measurement comprising:
means for performing a pressure measurement corresponding to an altitude at which the indoors pressure measurement unit is located;
means for transmitting a pressure parameter depending upon the pressure measurement to one of the User Equipment or a further indoors pressure measurement unit, the transmitted pressure parameter enabling determination of an indoors location of the User Equipment using the transmitted pressure parameter and at least a further pressure measurement performed locally at the User Equipment.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. An altitude determining circuitry for use in a user equipment of a wireless communication network, the altitude determining circuitry comprising:
a receiver to receive, from a first indoors pressure measurement unit, a coefficient calculated from a plurality of indoors pressure measurements from a respective plurality of indoors pressure measurement units located inside a building at corresponding measurement-unit altitudes; and
processing circuitry to receive from a pressure sensor in the user equipment a local pressure measurement at the user equipment and to determine an indoors altitude of the user equipment using the coefficient and the local pressure measurement, wherein the plurality of indoors pressure measurements comprise at least two indoors pressure measurements corresponding respectively to at least two different measurement-unit altitudes, and wherein the coefficient is independent of the local pressure measurement.

2. The altitude determining circuitry of claim 1, wherein the coefficient comprises values for the at least two indoors pressure measurements and wherein the processing circuitry is arranged to determine the indoors altitude of the user equipment using at least one difference between the local pressure measurement and the at least two indoors pressure measurement values to determine the indoors altitude of the user equipment relative to the measurement-unit altitudes.

3. The altitude determining circuitry of claim 2, wherein a subset comprising at least one of the measurement-unit altitudes are absolute altitudes and a complementary subset of the measurement-unit altitudes are relative altitudes.

4. The altitude determining circuitry of claim 2, wherein the receiver is arranged to receive an outdoors parameter corresponding to an outdoors pressure measurement made by an outdoors pressure measurement unit and wherein the processing circuitry is arranged to determine the indoors altitude of the user equipment using the outdoors parameter to determine a variation in pressure between outside the building and inside the building.

5. The altitude determining circuitry of claim 1, wherein the coefficient corresponds to a coefficient of an indoor pressure-altitude variation formula specifying an indoors pressure variation with altitude, the coefficient having been calculated using the plurality of indoors pressure measurements.

6. The altitude determining circuitry of claim 5, wherein the coefficient is calculated by the first indoors pressure measurement unit acting as a master pressure measurement unit at a master-unit altitude, the master pressure measurement unit arranged to receive pressure measurement values from at least one slave indoors pressure measurement unit having a respective slave-unit altitude(s).

7. The altitude determining circuitry of claim 6, wherein the processing circuitry is arranged to determine the user equipment altitude by using both the coefficient and the local pressure measurement in the indoor pressure-altitude variation formula.

8. The altitude determining circuitry of claim 7, wherein the master-unit altitude and at least one of the slave-unit altitude(s) are different altitudes and wherein the master pressure measurement unit is arranged to use the received pressure measurement values and to use a corresponding master-unit altitude and corresponding slave-unit altitude(s) to calculate the coefficient.

9. The altitude determining circuitry of claim 8, wherein the master pressure measurement unit is arranged to receive from at least one of the slave pressure measurement units a reference signal to enable calculation at the master pressure measurement unit of a z-axis distance, the z-axis distance corresponding to an altitude difference between the respective slave indoors pressure measurement unit and the master pressure measurement unit.

10. The altitude determining circuitry of claim 6, wherein a spatial direction corresponding to altitude is denoted a z-axis direction and wherein the master pressure measurement unit is arranged to receive, via a transmission from at least one of the slave indoors pressure measurement units, a z-axis distance between two given slave indoor pressure measurement units or a z-axis distance between a slave indoor pressure measurement unit and the master pressure measurement unit.

11. The altitude determining circuitry of claim 10, wherein the z-axis distance is calculated by the slave indoors pressure measurement unit from which the indoors pressure measurement was received at the master pressure measurement unit.

12. The altitude determining circuitry of claim 11, wherein the master pressure measurement unit is arranged to calculate the coefficient using the z-axis distance.

13. The altitude determining circuitry of claim 1, wherein the receiver is arranged to receive the coefficient by receiving and decoding one of a Wi-Fi signal or an Ultra-Wideband signal.

14. The altitude determining circuitry of claim 1, wherein the processing circuitry is arranged to use at least one of an x-coordinate and a y-coordinate of a spatial position of the respective indoors pressure measurement unit in addition to a z-coordinate corresponding to the measurement-unit altitude to determine at least a current indoors altitude of the user equipment.

15. A non-transitory computer-readable medium that comprises instructions that, responsive to being executed by one or more processors, cause a processing device to perform operations, to perform calculation of a user equipment indoors altitude, the operations comprising:
  receiving, by the one or more processors, from a first indoors pressure measurement unit located at a first altitude inside a building, a coefficient calculated from a plurality of indoors pressure measurements performed by the first indoors pressure measurement unit and at least one further pressure measurement unit located at a second, different altitude;
  receiving from a pressure sensor in the user equipment, a local pressure measurement at the user equipment; and
  determining a current indoors altitude of the user equipment using the coefficient and the local pressure measurement, wherein the coefficient is independent of the local pressure measurement.

16. The non-transitory computer-readable medium of claim 15, the operations further comprising determining an altitude difference between the indoors pressure measurement unit and the at least one further pressure measurement unit.

* * * * *